(12) United States Patent
Connors et al.

(10) Patent No.: US 8,342,255 B2
(45) Date of Patent: Jan. 1, 2013

(54) STEERABLE AGRICULTURAL IMPLEMENT WITH EQUALIZED STEERING EFFORT

(75) Inventors: Michael J. Connors, Lockport, IL (US); Brian Anderson, Yorkville, IL (US); Marvin A. Prickel, Homer Glen, IL (US); Leonard A. Bettin, LaGrange Park, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/608,453

(22) Filed: Oct. 29, 2009

(65) Prior Publication Data
US 2011/0100657 A1 May 5, 2011

(51) Int. Cl.
*A01B 69/00* (2006.01)
(52) U.S. Cl. ........ 172/278; 280/87.2; 172/288; 172/400
(58) Field of Classification Search ................. 172/278, 172/280, 282, 286, 287, 290, 383, 400, 401, 172/281, 283, 288; 280/87.2
See application file for complete search history.

(56) References Cited

U.S. PATENT DOCUMENTS

| | | | |
|---|---|---|---|
| 2,174,493 A | 9/1939 | Vanderwerf | |
| 2,370,468 A * | 2/1945 | Hyland | 172/282 |
| 2,702,193 A * | 2/1955 | Copeman et al. | 172/28 |
| 2,788,858 A * | 4/1957 | Aasland et al. | 180/210 |
| 2,863,518 A * | 12/1958 | Pellizzetti | 180/414 |
| 3,212,793 A | 10/1965 | Pietroroia | |
| 3,229,986 A | 1/1966 | Ferris | |
| 3,291,503 A | 12/1966 | De Lay | |
| 3,454,285 A | 7/1969 | Peursem | |
| 3,648,780 A * | 3/1972 | Fueslein et al. | 172/319 |
| 3,703,932 A | 11/1972 | Tuttle et al. | |
| 3,826,328 A * | 7/1974 | Sheppard | 180/406 |
| 4,219,208 A * | 8/1980 | Fuller et al. | 280/89.12 |
| 4,272,097 A * | 6/1981 | Cornelius | 172/311 |
| 4,496,004 A * | 1/1985 | Frase et al. | 172/311 |
| 4,552,375 A | 11/1985 | Kinzenbaw | |
| 5,024,279 A * | 6/1991 | Warner et al. | 172/1 |
| 5,135,056 A * | 8/1992 | Sartor | 172/221 |
| 5,244,226 A | 9/1993 | Bergh | |
| 5,255,756 A * | 10/1993 | Follmer et al. | 180/401 |
| 5,261,497 A | 11/1993 | Snyder et al. | |
| 6,158,759 A * | 12/2000 | Perry | 280/444 |
| 6,290,248 B1 | 9/2001 | Yrigoyen | |

(Continued)

FOREIGN PATENT DOCUMENTS
EP 0653343 5/1995

*Primary Examiner* — Jamie L McGowan
(74) *Attorney, Agent, or Firm* — Rebecca Henkel

(57) ABSTRACT

An agricultural implement is provided that includes a hitch assembly configured to couple the agricultural implement to a tow vehicle, and a carrier frame pivotally coupled to the hitch assembly. The agricultural implement also includes a pair of wheel assemblies each rotatably coupled to the carrier frame by a respective pivot joint. The agricultural implement further includes an actuator assembly configured to rotate each wheel assembly about the respective pivot joint in a first direction by applying a first torque, and to rotate each wheel assembly about the respective pivot joint in a second direction, opposite the first direction, by applying a second torque. A magnitude of the first torque and a magnitude of the second torque are substantially equal.

19 Claims, 9 Drawing Sheets

U.S. PATENT DOCUMENTS

| | | | |
|---|---|---|---|
| 6,397,953 B1 * | 6/2002 | Ankenman | 172/445.1 |
| 6,443,079 B1 | 9/2002 | Horsch | |
| 6,450,524 B1 * | 9/2002 | Lippens et al. | 280/445 |
| 6,883,821 B2 * | 4/2005 | Gunderson | 280/442 |
| 7,310,929 B2 | 12/2007 | Dow et al. | |
| 7,849,932 B2 * | 12/2010 | Friggstad et al. | 172/278 |
| 7,854,273 B2 * | 12/2010 | Friggstad et al. | 172/311 |
| 7,971,886 B2 * | 7/2011 | Neudorf et al. | 280/87.2 |
| 2007/0163791 A1 * | 7/2007 | Meek | 172/311 |
| 2009/0184491 A1 | 7/2009 | Neudorf et al. | |
| 2009/0272551 A1 | 11/2009 | Thompson et al. | |
| 2009/0273160 A1 | 11/2009 | Friggstad et al. | |

* cited by examiner

STEERABLE AGRICULTURAL IMPLEMENT WITH EQUALIZED STEERING EFFORT

BACKGROUND

The invention relates generally to a steerable agricultural implement with equalized steering effort.

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and close the soil in a single operation. Seeds are commonly dispensed from seed tanks and distributed to row units by a distribution system. To make the seeding operation as efficient as possible, very wide swaths may be covered by extending wings on either side of a central section of the implement pulled by the tractor. Included in the wing assemblies are tool bars, row units mounted thereon, and support wheels. The wings and row units are commonly disposed in a "floating" arrangement during the planting operation, wherein hydraulic cylinders allow the implement to contact the soil with sufficient force to open the soil, dispense the seeds and close the soil. For transport, the wings may be elevated and folded forward to reduce the width of the implement.

In certain configurations, an extendable hitch is employed to accommodate the folded length of the wings. Specifically, the hitch extends forward to increase the length of the implement and to provide sufficient space for the folded wings. As will be appreciated, the increased implement length places the ground engaging wheels further from the hitch, thereby increasing the turning radius of the implement. The larger turning radius may complicate the process of maneuvering the implement through turns, such as when turning off a narrow road and/or through a narrow pass into a field, or when maneuvering through other tight spots.

BRIEF DESCRIPTION

The present invention provides a steerable agricultural implement configured to equalize steering effort of the ground engaging main frame wheels. In an exemplary embodiment, the agricultural implement includes a hitch assembly configured to couple the agricultural implement to a tow vehicle. The agricultural implement also includes a carrier frame pivotally coupled to the hitch assembly, and a pair of wheel assemblies each rotatably coupled to the carrier frame by a respective pivot joint. An actuator assembly is configured to rotate each wheel assembly about the respective pivot joint in a first direction by applying a first torque, and to rotate each wheel assembly about the respective pivot joint in a second direction, opposite the first direction, by applying a second torque. A magnitude of the first torque and a magnitude of the second torque are substantially equal, thereby enabling the implement to turn with substantially equal speed in both the left and right directions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
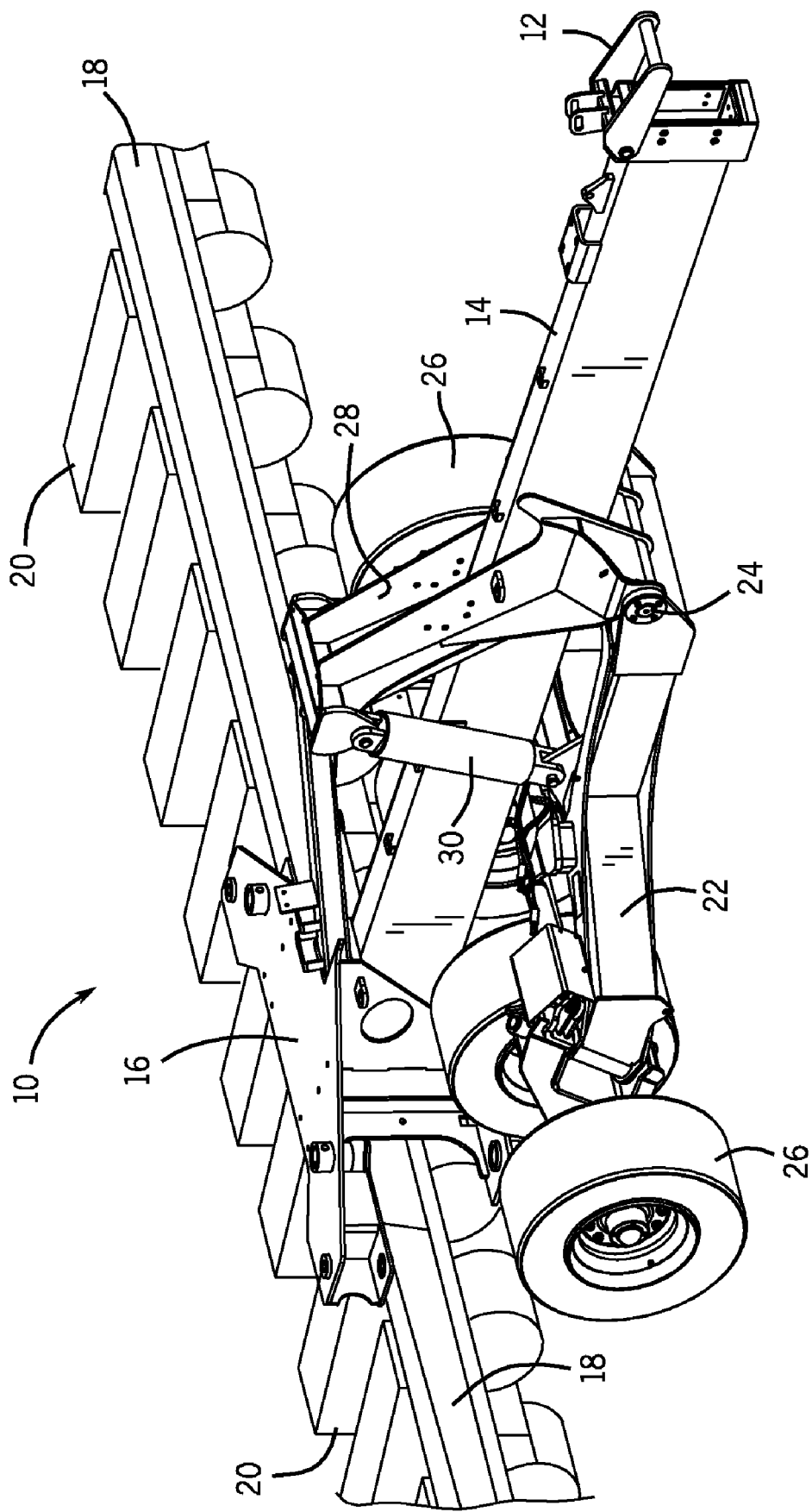
FIG. 1 is a perspective view of an agricultural implement in a working position, including an actuator assembly configured to steer the agricultural implement during operation.

Turning now to the drawings, FIG. 1 is a perspective view of an agricultural implement 10 in a working position. The implement 10 is designed to be towed behind a prime mover such as a tractor. The implement includes a tow hitch 12 which is coupled to a hitch assembly 14. The tow hitch 12 may be used to attach the implement 10 to a tractor and may be pivotally coupled to the hitch assembly 14 to facilitate flexibility as the implement changes elevation as it is towed across a field. A toolbar mounting structure 16 is coupled to the hitch assembly 14, and configured to pivotally secure toolbars 18. In the illustrated working position, the toolbars extend laterally outward from the mounting structure 16. Multiple row units 20, configured to deposit seeds and/or fertilizer into soil, are coupled to the toolbars 18. In the present embodiment, the toolbars 18 are configured to fold forward when the implement 10 is in a transport position. When in the transport position, the toolbars 18 are generally parallel to the hitch assembly 14. Furthermore, as discussed in detail below, the row units 20 are raised above the ground while the implement 10 is in the transport position.

As illustrated, a carrier frame 22 is rotatably coupled to the hitch assembly 14 by a pivot joint 24. Ground engaging wheels 26 are coupled to the carrier frame 22 to support the weight of the implement 10 during both operation and transport. In addition, a support frame 28 is coupled to the hitch assembly 14, and configured to support the carrier frame 22. Specifically, main lift cylinders 30 extend between the support frame 28 and the carrier frame 22. In the illustrated working position, the main lift cylinders 30 are in a retracted position such that the hitch assembly 14 is lowered relative to the carrier frame 22, thereby inducing the row units 20 to engage the soil. As discussed in detail below, the main lift cylinders 30 may extend to raise the row units 20 above the ground, thereby transitioning the implement into a transport position.

As discussed in detail below, the implement 10 includes an actuator assembly configured to facilitate equalized steering effort for maneuvering the implement 10. Certain implement steering mechanisms include a single hydraulic cylinder configured to rotate the wheels 26 in both a clockwise and counterclockwise direction. As will be appreciated, typical hydraulic cylinders include a piston disposed within a barrel. A piston rod extends from the piston, and is translated linearly based on a hydraulic pressure differential between a rod side and a cap side of the cylinder. Specifically, to extend the rod, hydraulic fluid is pumped into the cap side to force the piston away from the cap. Similarly, to retract the rod, hydraulic fluid is pumped into the rod side to force the piston toward the cap. As will be appreciated, the force applied by the rod is proportional to the area of the piston and the pressure of the hydraulic fluid. Consequently, for a particular hydraulic fluid pressure, the force applied to the cap side may be greater than the force applied to the rod side because the area of the rod side of the piston is smaller due to the presence of the rod. Therefore, implements employing a single hydraulic cylinder to rotate the wheels may be able to turn in one direction faster than the other direction, and be able to develop more power in one direction than the other.

The present embodiment is configured to equalize the steering effort and hydraulic volume, thereby facilitating substantially equal wheel rotation rates and forces for turning in both the right and left directions. That is, if each cylinder receives fluid at the same rate, the steering rate is the same in both directions. Specifically, the present embodiment employs two hydraulic cylinders, one attached to each wheel assembly. The cylinders are arranged such that the rods extend laterally outward from the center of the implement. In this configuration, a left turn may be initiated by extending the rod on the right cylinder and retracting the rod on the left cylinder. As previously discussed, the rods extend outward with greater force than they retract inward. Consequently, when engaging a left turn, the right cylinder may apply a greater torque to the right wheel assembly than the left cylinder applies to the left wheel assembly. To compensate for the disparate torques, the present embodiment employs a tie rod which couples one wheel assembly to the other. In this configuration, the greater torque applied by the extending cylinder is transferred to the wheel assembly with the retracting cylinder by the tie rod. As a result, the net torque applied to each wheel assembly is substantially equal. A similar transfer of torque will occur when the wheels are rotated in the opposite direction. This configuration enables the implement 10 to turn with substantially equal rotation rates in both the left and right directions. It should be noted, however, that oppositely-oriented cylinders may also be used to equalize the turning effort and speed. Similarly, a single double-rod end cylinder may be used for the same purpose.

Figure 2:
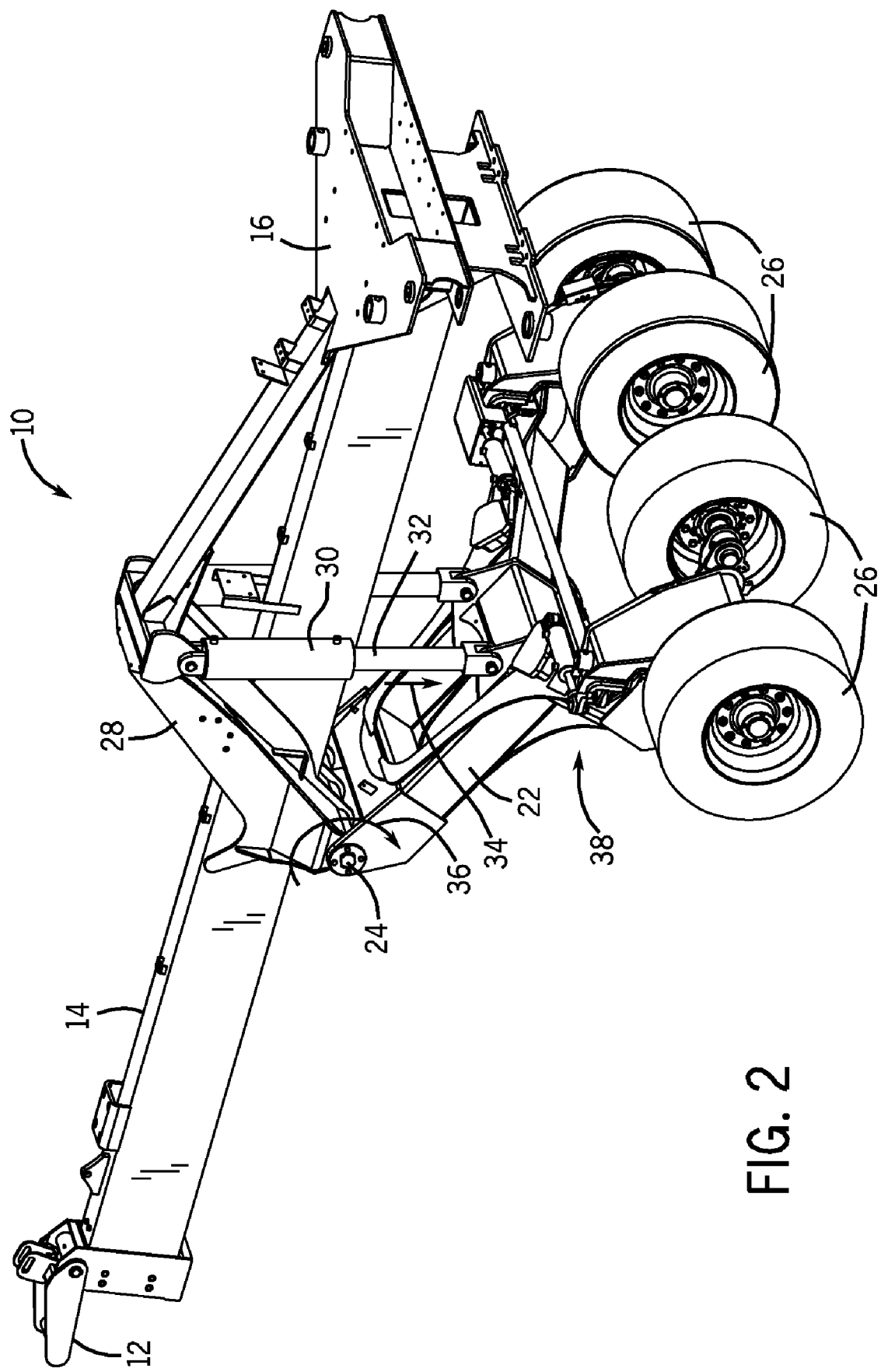
FIG. 2 is a perspective view of the agricultural implement, as shown in FIG. 1, in a transport position.

FIG. 2 is a perspective view of the agricultural implement 10 in a transport position. As illustrated, the main lift cylinders 30 are in an extended position to raise the hitch assembly 14 above the ground. In the present configuration, the main lift cylinders 30 are hydraulically operated and include a piston rod 32 which extends from the cylinder 30. As the rod 32 extends in the direction 34, the carrier frame 22 is driven to rotate in the direction 36 about the pivot joint 24. In this manner, the hitch assembly 14 is raised, thereby raising the row units 20 above the level of the soil. Furthermore, an actuator assembly 38 is coupled to the carrier frame 22. As discussed in detail below, the actuator assembly 38 is configured to rotate the wheels 26, thereby steering the implement 10.

Figure 3:
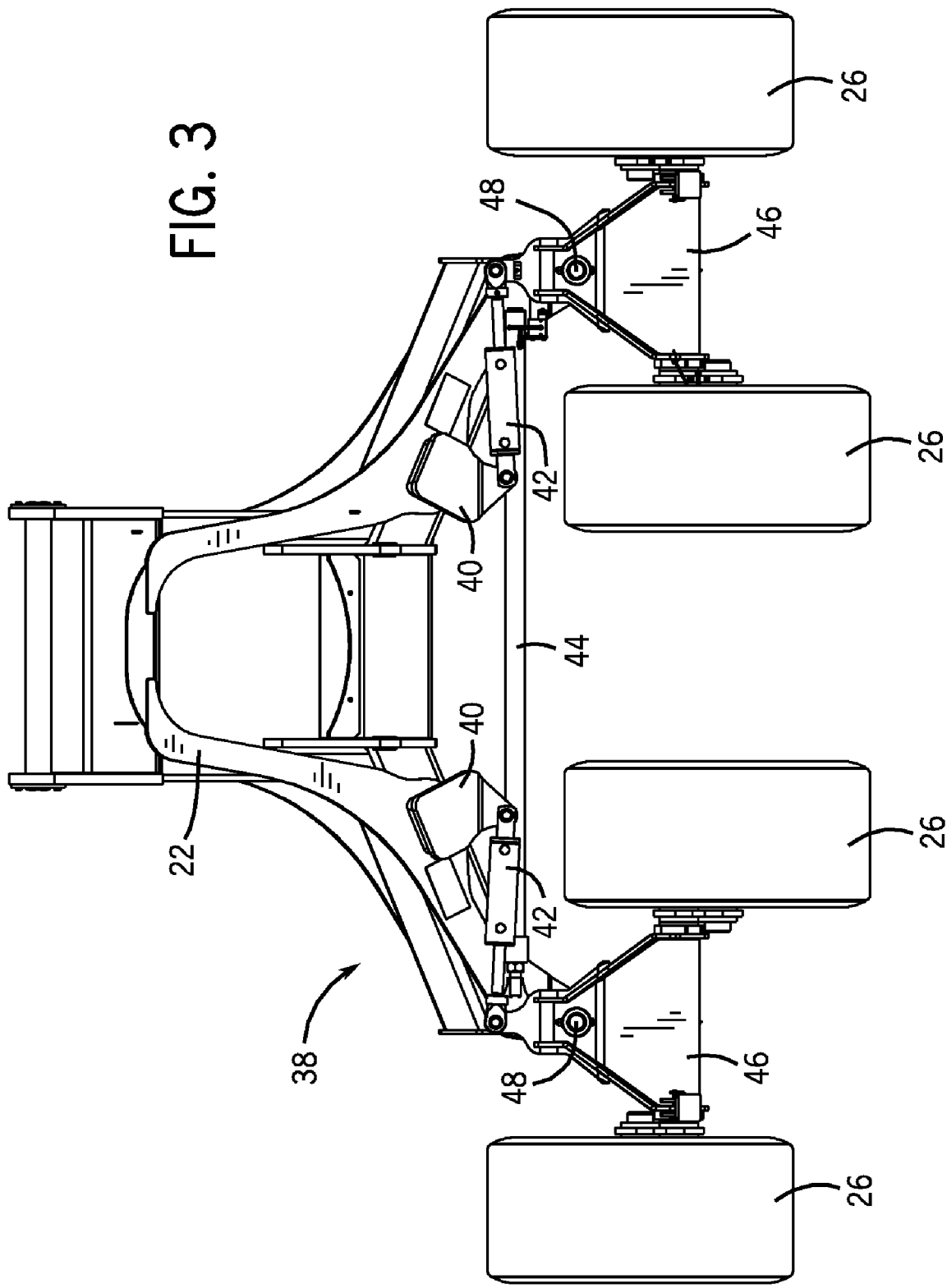
FIG. 3 is a top view of a carrier frame, wheel assemblies and an actuator assembly of the agricultural implement shown in FIG. 1.

FIG. 3 is a top view of the carrier frame 22, wheel assemblies 46 and actuator assembly 38 of the agricultural implement 10. As illustrated, the carrier frame 22 includes a pair of mounting brackets 40 configured to support hydraulic cylinders 42. In the present embodiment, the actuator assembly 38 includes the hydraulic cylinders 42 and a tie rod 44. As discussed in detail below, the combination of the hydraulic cylinders 42 and tie rod 44 may facilitate equalized steering effort for turning the implement in both the left and right directions. As illustrated, each hydraulic cylinder 42 extends between the carrier frame 22 and a respective wheel assembly 46, and the tie rod 44 extends between the wheel assemblies 46. The hydraulic cylinders 42 are configured to rotate each wheel assembly 46 about a pivot joint 48, while the tie rod 44 is configured to ensure that the wheel assemblies 46 rotate together by transferring torque between assemblies 46.

As discussed in detail below, a left turn may be initiated by extending a piston rod of the hydraulic cylinder 42 positioned on the right side of the carrier frame 22, thereby inducing the right wheel assembly 46 to rotate in a clockwise direction about the right pivot joint 48. At the same time, a piston rod of the hydraulic cylinder 42 positioned on the left side of the carrier frame 22 is retracted causing the left wheel assembly 46 to rotate in a clockwise direction. As previously discussed, because single rod end cylinders extend with greater force than they retract owing to the differential areas on either side of the piston, the right wheel assembly may rotate faster than the left wheel assembly. However, in the present configuration, the tie rod 44 serves to transfer the additional force applied by the right hydraulic cylinder 42 to the left wheel assembly 46. Consequently, a substantially equal torque will be applied to both wheel assemblies 46, thereby inducing both wheel assemblies 46 to rotate together. In other words, during a turn, the angle of the right wheel assembly 46 and the angle of the left wheel assembly 46 relative to the carrier frame 22 will be substantially equal. Similarly, during a right turn, the additional force applied by the left hydraulic cylinder 42 will be transferred through the tie rod 44 to the right wheel assembly 46, thereby transferring torque to the right wheel assembly 46. Therefore, the present embodiment may enable the implement 10 to turn in both the left and right directions at a substantially equal rate.

Figure 4:
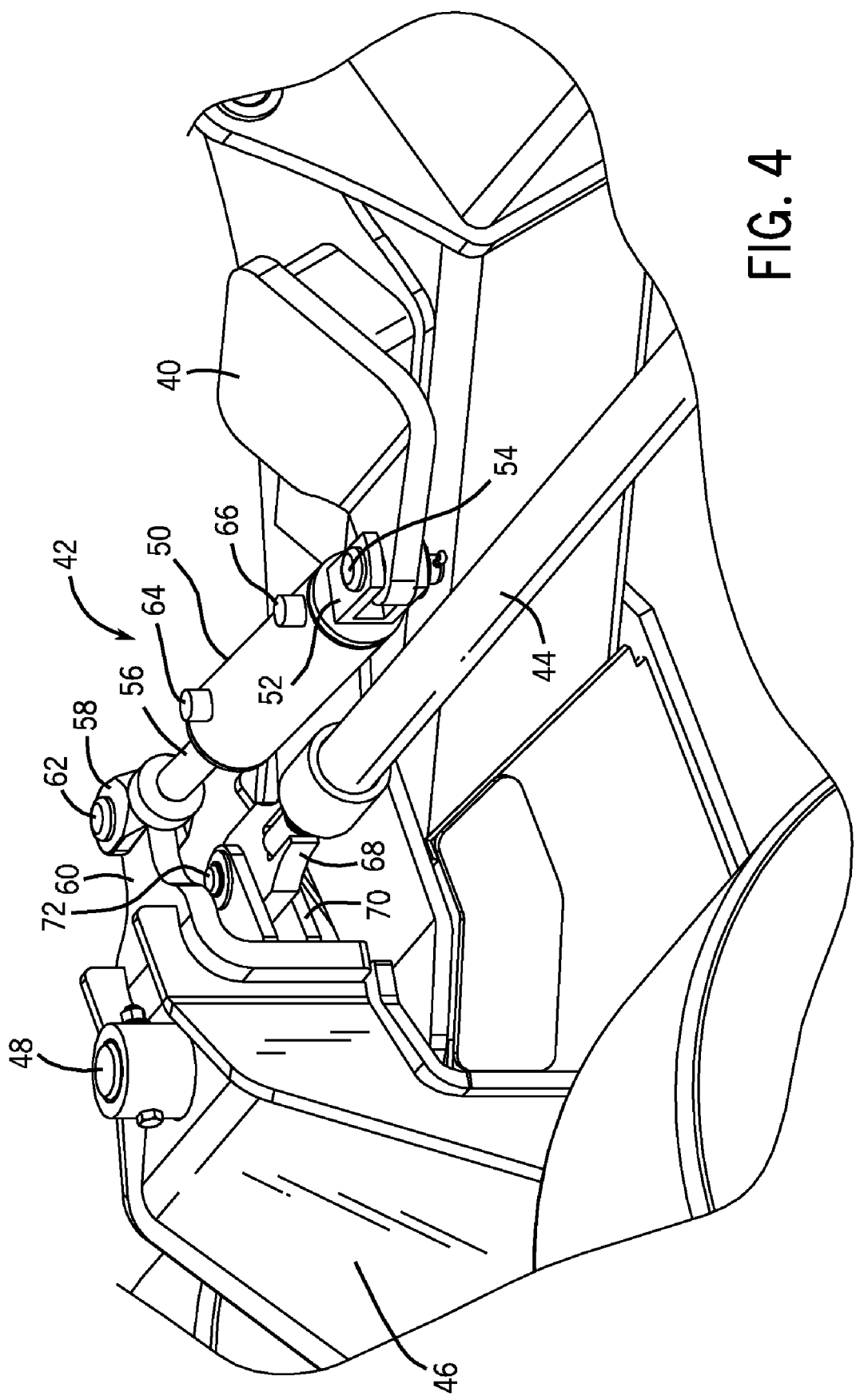
FIG. 4 is a perspective view of a portion of the actuator assembly, as shown in FIG. 3, illustrating the coupling of the actuator assembly to the carrier frame and a first wheel assembly.

FIG. 4 is a perspective view of a portion of the actuator assembly 38 illustrating the coupling of the actuator assembly 38 to the carrier frame 22 and a first (e.g., left) wheel assembly 46. As illustrated, the hydraulic cylinder 42 includes a barrel 50 and a first clevis 52 coupled to one end of the barrel 50. A pin 54 passes through openings within the clevis 52 and a corresponding opening within the mounting bracket 40 to secure the hydraulic cylinder 42 to the mounting bracket 40. The hydraulic cylinder 42 also includes a piston rod 56. As previously discussed, the piston rod 56 is coupled to a piston within the hydraulic cylinder 42. Consequently, when a hydraulic fluid pressure differential induces the piston to translate within the barrel 50, the piston rod 56 is driven to extend or retract relative to the barrel 50. A second clevis 58 is coupled to the piston rod 56, and serves to secure the piston rod 56 to a mounting bracket 60 of the wheel assembly 46. Specifically, a pin 62 is disposed through openings within the clevis 58 and a corresponding opening within the mounting bracket 60, thereby securing the hydraulic cylinder 42 to the wheel assembly 46.

In the present configuration, the hydraulic cylinder includes a first port 64 and a second port 66. These ports 64 and 66 serve to couple the hydraulic cylinder 42 to conduits configured to deliver hydraulic fluid to the hydraulic cylinder 42. Specifically, the first port 64 is positioned on the rod side of the piston. In typical hydraulic cylinders, the piston rod 56 passes through a gland coupled to the barrel 50 on the end opposite from the first clevis 52. The gland, in combination with one or more seals, serves to contain hydraulic fluid within a volume defined by the barrel 50, the piston and the gland. Providing hydraulic fluid to this volume on the rod side of the piston, causes the piston to drive the rod 56 into the barrel 50, thereby inducing the wheel assembly 46 to rotate clockwise. Conversely, by applying hydraulic fluid to the second port 66, the rod 56 is driven to extend from the barrel 40, thereby inducing the wheel assembly 46 to rotate counterclockwise. Specifically, the second port 66 serves to couple a hydraulic conduit to a cap side of the piston. By providing hydraulic fluid to the cap side, the piston is driven away from the first clevis 52, thereby driving the piston rod 56 to extend from the barrel 50.

As previously discussed, the tie rod 44 is coupled to the wheel assembly 46 and serves to transfer torque between the right and left wheel assemblies. As illustrated, a tang 68 coupled to the tie rod end is secured to a clevis 70 of the wheel assembly 46. Specifically, a pin 72 passes through openings within the clevis 70 and a corresponding opening within the tang 68 to secure the tie rod 44 to the wheel assembly 46. Consequently, the tie rod 44 serves to ensure that the left and right wheel assemblies 46 rotate together despite force variations between the hydraulic cylinders 42.

Figure 5:
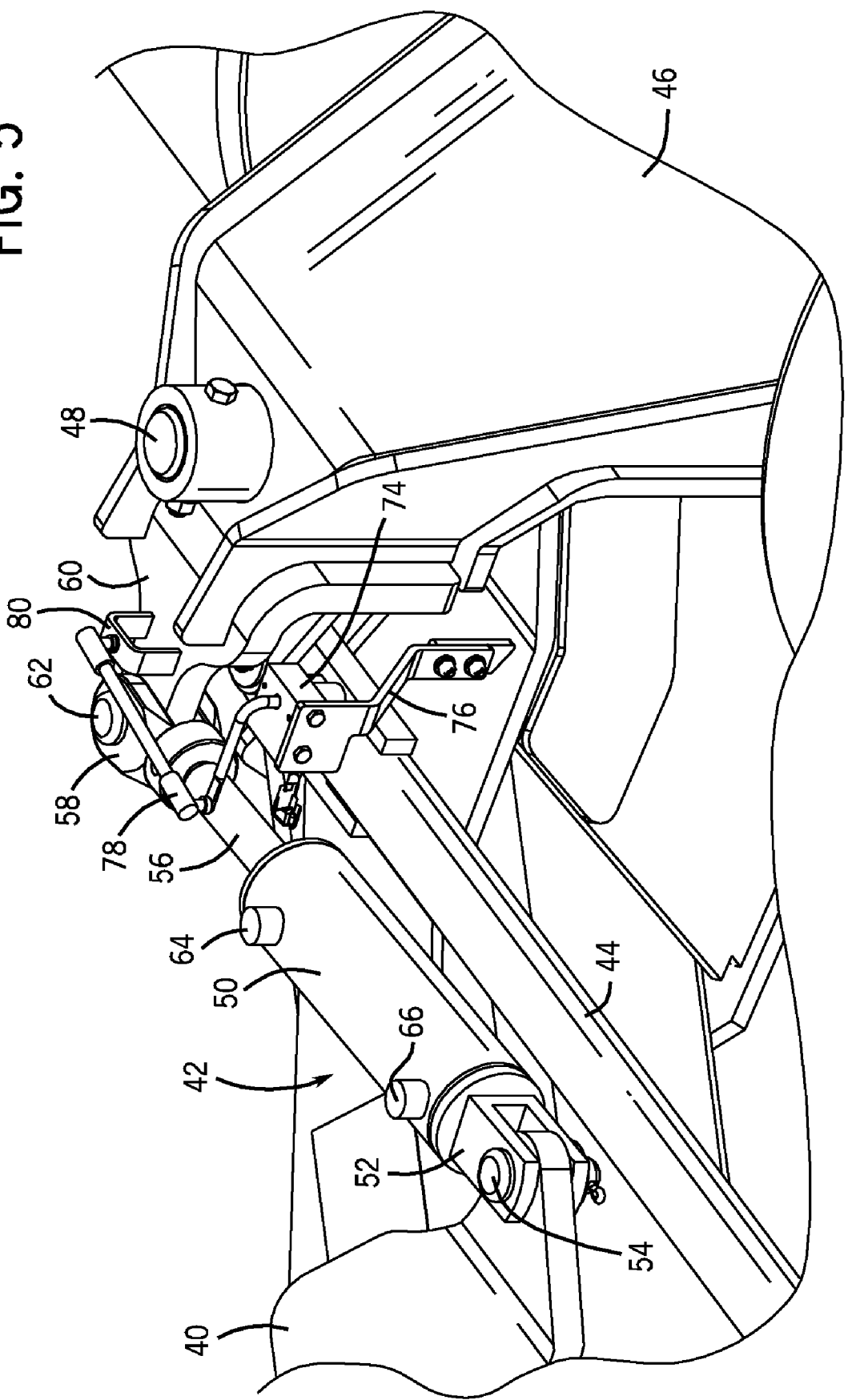
FIG. 5 is a perspective view of a portion of the actuator assembly, as shown in FIG. 3, illustrating the coupling of the actuator assembly to the carrier frame and a second wheel assembly.

FIG. 5 is a perspective view of a portion of the actuator assembly 38 illustrating the coupling of the actuator assembly 38 to the carrier frame 22 and a second (e.g., right) wheel assembly 46. As illustrated, the configuration of the hydraulic cylinder 42, tie rod 44, and wheel assembly 46 is substantially similar to the configuration shown in FIG. 4. However, the right wheel assembly includes a sensor 74 configured to detect an angle of the wheel assembly 46 relative to the carrier frame 22. In the present configuration, the sensor 74 is a non-contact potentiometer. However, as will be appreciated, the sensor 74 may include any suitable device capable of measuring a position of the wheel assembly 46 relative to the carrier frame 22. The sensor 74 is mounted to the carrier frame 22 by a support bracket 76. A linkage 78 couples the sensor 74 to a mounting bracket 80 of the wheel assembly 46. As discussed in detail below, as the wheel assembly rotates, the sensor 74 detects movement of the linkage 78, and then outputs a signal indicative of the degree of rotation.

In certain embodiments, the sensor 74 is coupled to a controller configured to control valving for directing hydraulic fluid to each cylinder 42 based on the output signal from the sensor 74. For example, when an operator initiates a turn, the controller may cause directional control valving to apply hydraulic fluid to the hydraulic cylinders 42 until a desired angle of the wheel assemblies 46 relative to the carrier frame 22 or prime mover is achieved. In this manner, the controller may automatically rotate the wheel assemblies 46 to a desired angle based on output from the sensor 74. While the present configuration employs hydraulic cylinders 42 with the piston rods 56 coupled to the wheel assemblies 46 and the barrels 50 coupled to the carrier frame 22, it should be appreciated that alternative embodiments may employ hydraulic cylinders 42 with the piston rods 56 coupled to the carrier frame 22 and the barrels 50 coupled to the wheel assemblies 46. However, in either configuration, the piston rod 56 of each hydraulic cylinder 42 should face in substantially opposite lateral directions.

Figure 6:
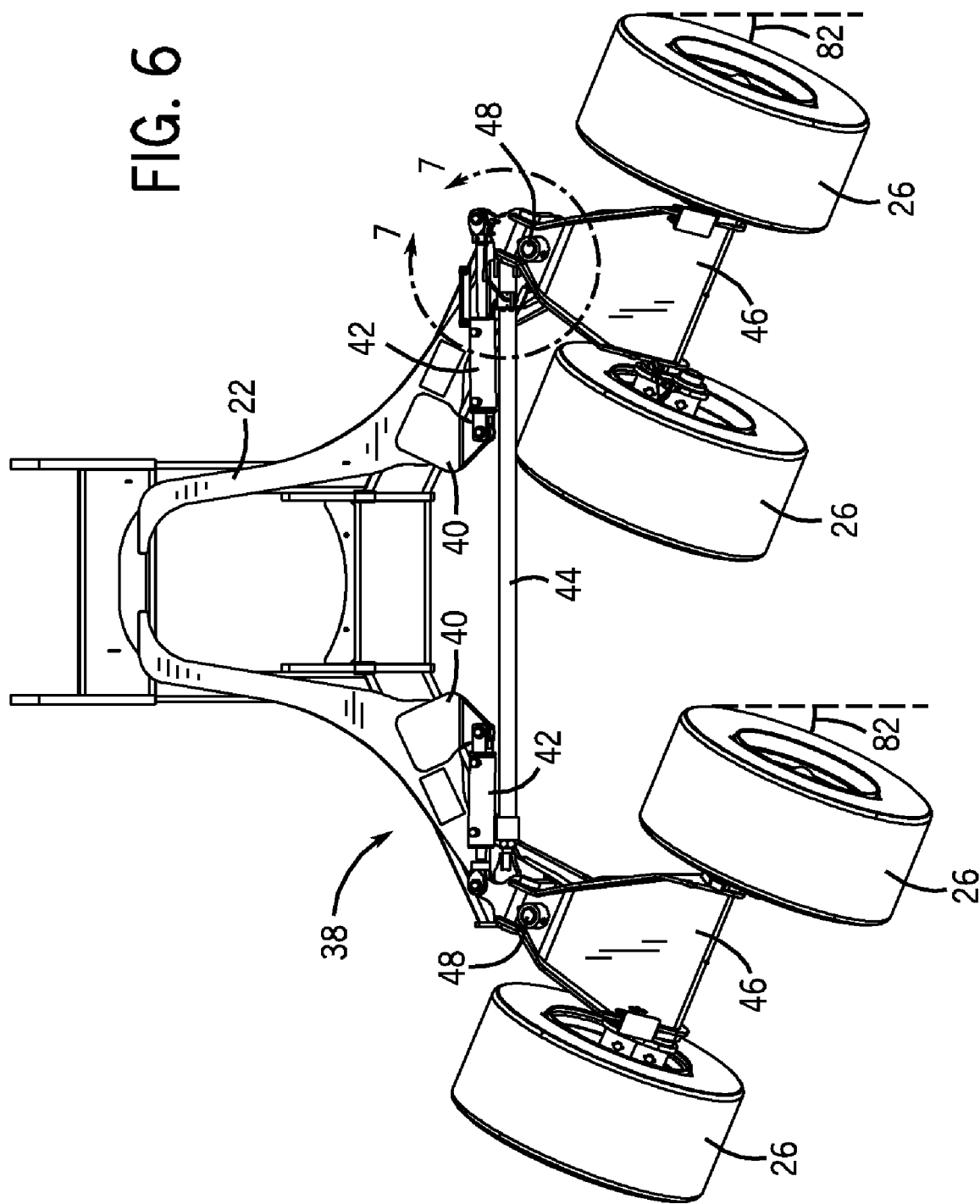
FIG. 6 is a top view of the carrier frame, wheel assemblies and the actuator assembly, as shown in FIG. 3, in which the wheel assemblies are oriented to steer the agricultural implement in a left turn.

FIG. 6 is a top view of the carrier frame 22, wheel assemblies 46 and actuator assembly 38, in which the wheel assemblies 46 are oriented to steer the agricultural implement 10 in a left turn. As illustrated, the wheel assemblies 46 are oriented at an angle 82 relative to the carrier frame 22. In the illustrated embodiment, the angle is approximately 25 degrees. In certain embodiments, the wheel assemblies 46 may be capable of rotating between approximately 0 to 60, 0 to 50, 0 to 40, or about 0 to 30 degrees. In this manner, the actuator assembly 38 may steer the implement 10 to a desired orientation based on user input or automatically based on a degree of rotation of the tow vehicle. As illustrated, because the wheel assemblies 46 are linked by the tie rod 44, the rotation angle 82 of each wheel assembly 46 relative to the carrier frame 22 is substantially equal.

Figure 7:
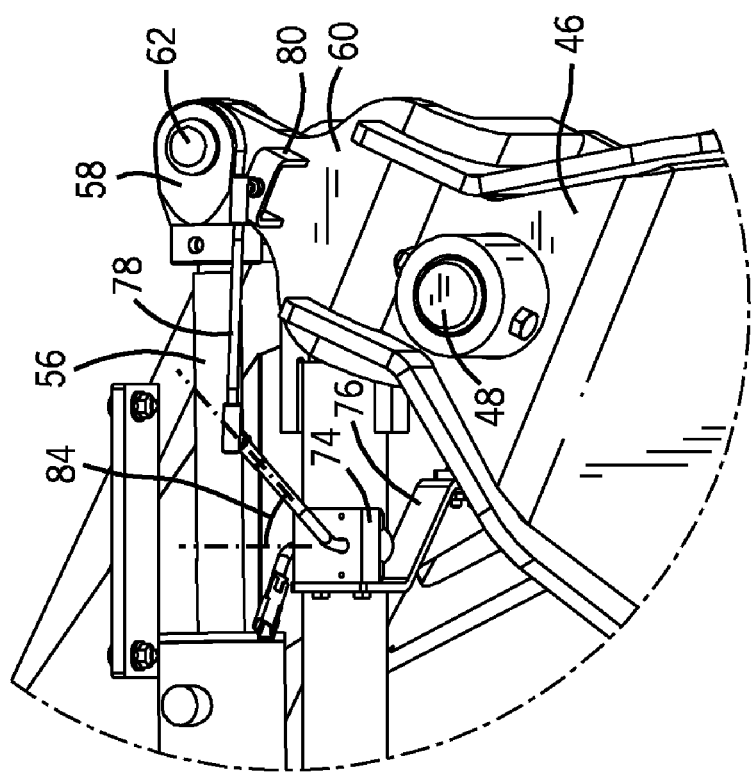
FIG. 7 is a detailed top view of the carrier frame, wheel assemblies and the actuator assembly, taken within line 7-7 of FIG. 6.

FIG. 7 is a detailed top view of the carrier frame 22, wheel assemblies 46 and actuator assembly 38 taken within line 7-7 of FIG. 6. As illustrated, when the implement 10 engages a left turn, the wheel assemblies 46 rotate in a clockwise direction about the pivot joints 48. Consequently, the bracket 80 translates to the right, thereby inducing the linkage to rotate clockwise with respect to the sensor 74. As illustrated, the linkage 78 forms an angle 84 with respect to the non-rotated orientation. The sensor 74 is configured to output a signal based on the angle 84, which is indicative of the angle 82. In the illustrated embodiment, the angle 84 corresponds to an angle 82 of approximately 25 degrees. Consequently, when the sensor 74 detects an angle 84 of the linkage, it will output a signal indicative of a 25 degree clockwise rotation of the wheel assembly 46.

Figure 8:
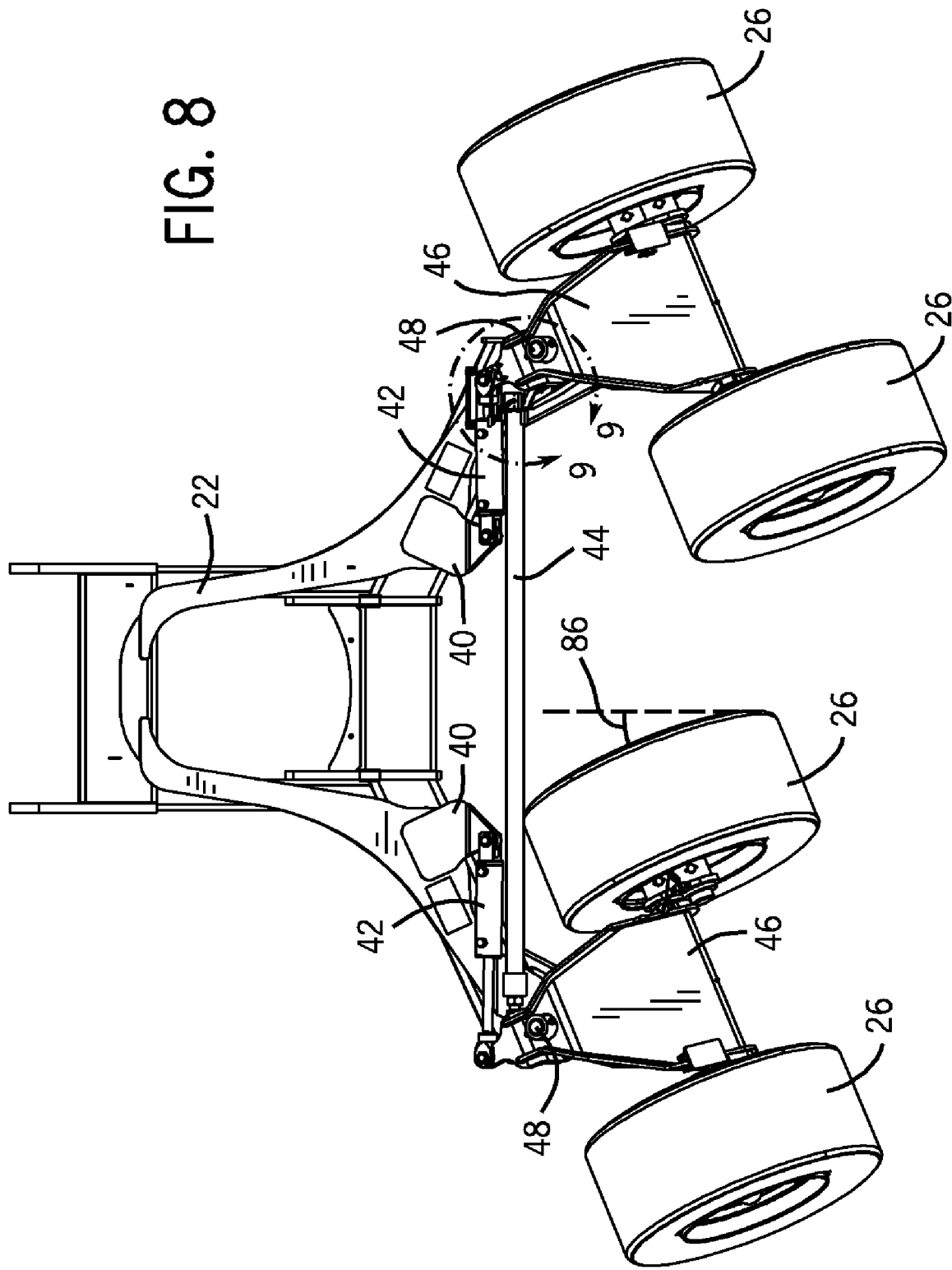
FIG. 8 is a top view of the carrier frame, wheel assemblies and the actuator assembly, as shown in FIG. 3, in which the wheel assemblies are oriented to steer the agricultural implement in a right turn.

FIG. 8 is a top view of the carrier frame 22, wheel assemblies 46 and actuator assembly 38, in which the wheel assemblies 46 are oriented to steer the agricultural implement 10 in a right turn. As illustrated, the wheel assemblies 46 are oriented at an angle 86 relative to the carrier frame 22. In the illustrated embodiment, the angle is approximately 25 degrees. In certain embodiments, the wheel assemblies 46 may be capable of rotating between approximately 30 degrees to the left and approximately 30 degrees to the right. In this manner, the actuator assembly 38 may steer the implement 10 to a desired orientation based on user input or automatically based on a degree of rotation of the tow vehicle. As illustrated, because the wheel assemblies 46 are linked by the tie rod 44, the rotation angle 86 of each wheel assembly 46 relative to the carrier frame 22 is substantially equal.

Figure 9:
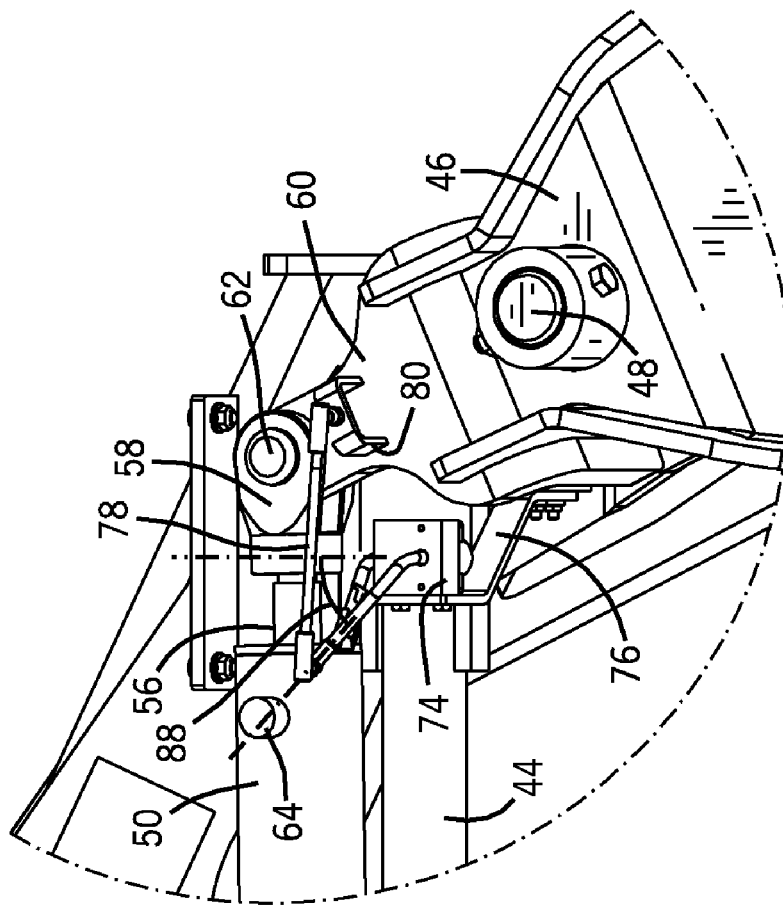
FIG. 9 is a detailed top view of the carrier frame, wheel assemblies and the actuator assembly, taken within line 9-9 of FIG. 8.

FIG. 9 is a detailed top view of the carrier frame 22, wheel assemblies 46 and actuator assembly 38 taken within line 9-9 of FIG. 8. As illustrated, when the implement 10 engages a right turn, the wheel assemblies 46 rotate in a counterclockwise direction about the pivot joints 48. Consequently, the bracket 80 translates to the left, thereby inducing the linkage to rotate counterclockwise with respect to the sensor 74. As illustrated, the linkage 78 forms an angle 88 with respect to the non-rotated orientation. The sensor 74 is configured to output a signal based on the angle 88 and indicative of the angle 86.

Figure 10:
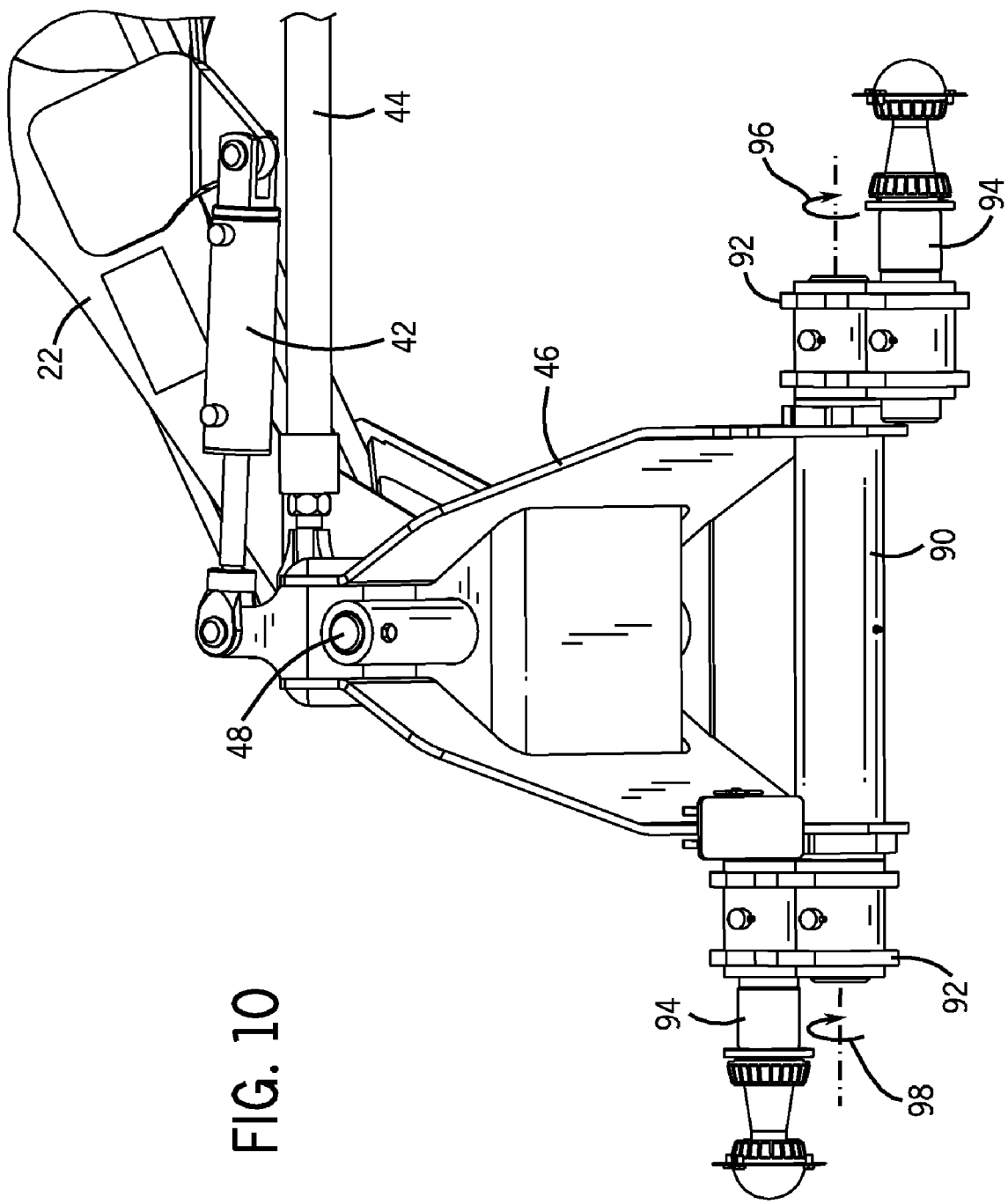
FIG. 10 is a top view of the first wheel assembly, illustrating a wheel rocking assembly.

FIG. 10 is a top view of a wheel assembly 46, illustrating a wheel rocking assembly. As illustrated, the wheel assembly 46 includes a main axle 90 rotatably coupled to the body or knuckle of the wheel assembly 46. A linkage 92 is rigidly coupled to each end of the main axle 90. Each linkage 92 couples a secondary axle 94 to the main axle 90. The secondary axles 94 are configured to support the wheels 26. As illustrated, the secondary axles 94 are offset from the main axle 90, with each axle 94 being equally displaced in an opposite longitudinal direction. Consequently, when one wheel 26 encounters a variation in soil elevation (e.g., trench, bump, etc.), the other wheel 26 may maintain contact with the soil. For example, if the right wheel 26 encounters a bump, the right secondary axle 94 will rotate in the direction 96. Because the right secondary axle 94 is rigidly coupled to the main axle 90 by the linkage 92, rotation of the right secondary axle 94 causes the main axle 90 to rotate. Consequently, coupling between the main axle 90 and the left secondary axle 94 causes the left secondary axle 94 to rotate in the direction 98. This configuration enables the left wheel 26 to maintain contact with the soil even if the right wheel 26 encounters a variation in soil elevation. Similarly, if the left wheel 26 experiences a change in elevation, the wheel rocking assembly may enable the right wheel 26 to maintain contact with the soil. As a result, variations in the soil engagement depth of the row units 20 may be substantially reduced or eliminated because movement of the carrier frame 22 is half of the variation in soil elevation. Also, it will be appreciated that weight distribution on the wheels 26 is maintained when variations in soil elevation are encountered.

Furthermore, the wheel rocking mechanism may enable the implement 10 to maintain substantially constant row unit spacing during operation. As will be appreciated, the orientation of the implement 10 may drift with respect to a tow vehicle during operation. Consequently, the present actuator assembly 38 may vary the orientation of the wheel assemblies 46 to adjust the path of the implement 10 such that the row units 20 form substantially parallel rows. As the orientation of the wheel assemblies 46 varies, the rocking mechanism may ensure that the penetration depth of the row units 20 remains substantially constant. As a result, the wheel assemblies 46 may be steered while the implement 10 is in the working position, as well as the transport position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
    a hitch assembly configured to couple the agricultural implement to a tow vehicle;
    a carrier frame coupled to the hitch assembly;
    first and second wheel assemblies each rotatably coupled to the carrier frame by a respective pivot joint;
    at least one actuator configured to rotate the wheel assemblies about the respective pivot joints in a first direction by applying a first torque, and to rotate the wheel assemblies about the respective pivot joints in a second direction, opposite the first direction, by applying a second torque, wherein a magnitude of the first torque and a magnitude of the second torque are substantially equal, wherein the at least one actuator comprises a first actuator coupled to the first wheel assembly, and a second actuator coupled to the second wheel assembly;
    a tie rod extending between the first wheel assembly and the second wheel assembly, wherein the tie rod is configured to transfer torque between the pair of wheel assemblies, and wherein the tie rod and the at least one actuator are coupled to a first side of each wheel assembly forward of the respective pivot joint along a direction of travel; and
    at least one wheel rotatably coupled to a second side of each wheel assembly, opposite the first side, rearward of the respective pivot joint along the direction of travel.

2. The agricultural implement of claim 1, wherein when equal flow rates of actuating fluid are applied to the actuators for turning in the first and second directions, rates of rotation of the wheel assemblies are substantially equal.

3. The agricultural implement of claim 1, wherein the first and second actuators comprise linear actuators extending between the carrier frame and the respective wheel assembly.

4. The agricultural implement of claim 1, wherein the first and second actuators comprise hydraulic cylinders.

5. The agricultural implement of claim 1, comprising a sensor coupled to the carrier frame and at least one wheel assembly, wherein the sensor is configured to output a signal indicative of an angle of the at least one wheel assembly relative to the carrier frame.

6. The agricultural implement of claim 5, wherein the at least one actuator is configured to automatically rotate the pair of wheel assemblies to a desired angle relative to the carrier frame based on the signal.

7. The agricultural implement of claim 1, wherein each wheel assembly comprises a wheel rocking mechanism configured to vary a first vertical position of a first wheel in a direction substantially opposite from a second vertical position of a second wheel.

8. The agricultural implement of claim 7, wherein each wheel rocking mechanism comprises:
    a main axle rotatably coupled to a knuckle;
    a first secondary axle configured to support the first wheel, and coupled to a first end of the main axle by a first linkage; and
    a second secondary axle configured to support the second wheel, and coupled to a second end of the main axle by a second linkage, wherein the first linkage and the second linkage offset the first and second secondary axles in opposite longitudinal directions such that rotation of the first secondary axle about the main axle induces rotation of the second secondary axle about the main axle.

9. The agricultural implement of claim 1, comprising at least one main lift cylinder extending between the hitch assembly and the carrier frame, and configured to selectively lower the hitch assembly into a working position and raise the hitch assembly into a transport position.

10. The agricultural implement of claim 9, wherein the at least one actuator is configured to rotate each wheel assembly about the respective pivot joint while the hitch assembly is in both the working and transport positions.

11. An agricultural implement, comprising:
    a hitch assembly configured to couple the agricultural implement to a tow vehicle;
    a carrier frame pivotally coupled to the hitch assembly;
    a first wheel assembly rotatably coupled to the carrier frame by a first pivot joint;
    a first hydraulic cylinder extending between the first wheel assembly and the carrier frame, wherein the first hydraulic cylinder is configured to rotate the first wheel assembly about the first pivot joint;
    a second wheel assembly rotatably coupled to the carrier frame by a second pivot joint;
    a second hydraulic cylinder extending between the second wheel assembly and the carrier frame, wherein the second hydraulic cylinder is configured to rotate the second wheel assembly about the second pivot joint;
    a tie rod extending between the first wheel assembly and the second wheel assembly, wherein the tie rod is configured to transfer torque between the wheel assemblies, and wherein the tie rod and the first hydraulic cylinder are coupled to a first side of the first wheel assembly forward of the first pivot joint along a direction of travel, and the tie rod and the second hydraulic cylinder are coupled to a first side of the second wheel assembly forward of the second pivot joint along the direction of travel; and at least one wheel rotatably coupled to a second side of the first wheel assembly, opposite the first side, rearward of the first pivot joint along the direction of travel, and at least one wheel rotatably coupled to a second side of the second wheel assembly, opposite the first side, rearward of the second pivot joint along the direction of travel.

12. The agricultural implement of claim 11, comprising a sensor coupled to the carrier frame and at least one wheel assembly, wherein the sensor is configured to output a signal indicative of an angle of the at least one wheel assembly relative to the carrier frame.

13. The agricultural implement of claim 12, wherein the first and second hydraulic cylinders are configured to automatically rotate the first and second wheel assemblies to a desired angle relative to the carrier frame based on the signal.

14. The agricultural implement of claim 11, wherein each wheel assembly comprises a wheel rocking mechanism configured to vary a first vertical position of a first wheel in a direction substantially opposite from a second vertical position of a second wheel.

15. An agricultural implement, comprising:
a hitch assembly configured to couple the agricultural implement to a tow vehicle;
a carrier frame pivotally coupled to the hitch assembly;
a first wheel assembly rotatably coupled to the carrier frame by a first pivot joint;
a first actuator configured to rotate the first wheel assembly about the first pivot joint in a first direction and a second direction;
a second wheel assembly rotatably coupled to the carrier frame by a second pivot joint;
a second actuator configured to rotate the second wheel assembly about the second pivot joint in the first direction and the second direction, wherein the first and second actuators apply a first aggregate torque in the first direction and a second aggregate torque in the second direction, and wherein the first and second aggregate torques are substantially equal;
a tie rod extending between the first wheel assembly and the second wheel assembly, wherein the tie rod is configured to transfer torque between the wheel assemblies, and wherein the tie rod and the first actuator are coupled to a first side of the first wheel assembly forward of the first pivot joint along a direction of travel, and the tie rod and the second actuator are coupled to a first side of the second wheel assembly forward of the second pivot joint along the direction of travel; and
at least one wheel rotatably coupled to a second side of the first wheel assembly, opposite the first side, rearward of the first pivot joint along the direction of travel, and at least one wheel rotatably coupled to a second side of the second wheel assembly, opposite the first side, rearward of the second pivot joint along the direction of travel.

16. The agricultural implement of claim 15, comprising a sensor coupled to the carrier frame and at least one wheel assembly, wherein the sensor is configured to output a signal indicative of an angle of the at least one wheel assembly relative to the carrier frame.

17. The agricultural implement of claim 16, wherein the first and second actuators are configured to automatically rotate the first and second wheel assemblies to a desired angle relative to the carrier frame based on the signal.

18. The agricultural implement of claim 15, wherein the first and second actuators each comprise a hydraulic cylinder extending between the carrier frame and a respective wheel assembly.

19. The agricultural implement of claim 15, wherein each wheel assembly comprises a wheel rocking mechanism configured to vary a first vertical position of a first wheel in a direction substantially opposite from a second vertical position of a second wheel.

* * * * *